United States Patent [19]

McDaid

[11] Patent Number: 5,647,520

[45] Date of Patent: Jul. 15, 1997

[54] BICYCLE LOCK BRACKET WITH SPLINES

[75] Inventor: Cornelius McDaid, Dorchester, Mass.

[73] Assignee: Kryptonite Corporation, Canton, Mass.

[21] Appl. No.: 565,926

[22] Filed: Dec. 1, 1995

[51] Int. Cl.$^6$ .................................................. B62J 11/00
[52] U.S. Cl. ........................... 224/425; 248/314; 224/427; 224/451; 224/459
[58] Field of Search ................................. 224/420, 447, 224/448, 451, 935, 39, 427, 425, 459; 248/219.4, 523, 526, 314

[56] References Cited

U.S. PATENT DOCUMENTS

| | | |
|---|---|---|
| 632,858 | 9/1899 | Waisel et al. . |
| 4,436,232 | 3/1984 | Zane et al. . |
| 4,736,921 | 4/1988 | Zane et al. ........................ 248/316.2 |
| 5,076,526 | 12/1991 | Zane et al. ........................ 248/314 |
| 5,127,562 | 7/1992 | Zane et al. . |
| 5,459,308 | 10/1995 | Lin ................................... 248/314 X |

FOREIGN PATENT DOCUMENTS 4312033  11/1993  Germany .................... B62H 5/00

Primary Examiner—Renee S. Luebke
Attorney, Agent, or Firm—Morse, Altman & Benson

[57] ABSTRACT

A bicycle lock bracket for use with a lock that has an elongated portion with a free end when the lock is open. The bracket includes at least one spline on the elongated portion and a body fastened to the bicycle frame. The spline is either integral with the elongated portion or is on a collar affixed to the elongated portion. The body includes a hub with an opening for receiving the elongated portion. At least one groove in the inner wall of the opening mates with the spline. If there is more than one groove, they are spaced equidistantly about the opening. The elongated portion is prevented from traveling completely through the opening by a shoulder on the collar or a stop at the end of at least one groove. The body includes a seat for fastening the body to the bicycle frame.

22 Claims, 7 Drawing Sheets

BICYCLE LOCK BRACKET WITH SPLINES

BACKGROUND OF THE INVENTION

1. Field of the Invention

The present invention relates to mounting brackets for bicycle U-locks, and, more particularly, to a universal mounting bracket for releasably securing a bicycle U-lock to a bicycle frame.

2. The Prior Art

Since the invention of the bicycle lock and the continued improvement thereof, brackets for removably mounting these locks to the bicycle while not in use have not been far behind. In the mid 1970's, a bicycle lock comprising a U-shaped shackle and a crossbar and a matching bracket were developed, see U.S. Pat. No. 4,155,231, and since then, the U-lock has become a favorite with bicyclists. The U-lock has gone through a series of improvements, but has maintained the basic U-shaped shackle and crossbar. As improvements in the U-lock have continued, so have brackets. There now exists a variety of brackets for removably attaching a U-lock to the bicycle, both single-part and two-part devices. Two such single-part brackets are disclosed in U.S. Pat. No. 4,736,921, Clamp for Holding Bicycle Lock, and U.S. Pat. No. 5,076,526, Fastener for Bicycle Accessories. The single-part bracket has a pair of opposed contoured clamps. One clamp attaches to the bicycle frame and the other clamp has an L-shaped opening for holding the U-lock. The crossbar of an assembled U-lock is inserted into the vertical portion of the opening and is rotated until the shackle is aligned with the horizontal portion of the opening, and then inserted into the horizontal portion. In the disclosure of U.S. Pat. No. 4,736,921, the U-lock is held in place by the camming action of a lever that presses the sides of the horizontal portion against the shackle of the lock. In the disclosure of U.S. Pat. No. 5,076,526, the U-lock is held in place by a snap action facilitated by small protrusions at the top of the horizontal portion.

A typical two-part bracket is disclosed in German Patent No. DE4312033A1. One part of the bracket mounts to the bicycle and the other part attaches to the lock. The two parts removably connect together by a tongue-in-groove mechanism, where the tongue of the lock-attached part slides into a groove in the cycle-mounted part. The two parts are kept from separating by a flexible strip that snaps into a slot in the tongue. The parts are separated by pressing together the ends of the strip so that it bends out of the slot, and sliding the tongue out of the groove.

While these prior art brackets achieve their intended function, each has its drawbacks. Such drawbacks include (1) a loose fit so that the lock rattles when riding the bicycle, (2) only one viable bicycle mounting position because there is only one away that the U-lock can be attached to the bracket, (3) a safety issue wherein the U-lock can be ejected from the bracket during an accident, causing injury, and (4) moving parts that can jam if they become dirty.

BRIEF SUMMARY OF THE INVENTION

The bicycle lock bracket of the present invention is intended to overcome the disadvantages inherent in the prior art bicycle lock brackets. The bracket system is for use with a lock that has an elongated portion and an optionally free end, and includes: (a) at least one spline on the elongated portion, the spline being substantially parallel to the elongated portion axis; (b) a body having a hub at one end, a seat at the other end, and a medial section therebetween; (c) the hub having an opening along a hub axis for reception of the elongated portion, the hub having a cross-sectional profile that presents at least a groove parallel to the hub axis; (d) the seat being disposed along a seat axis for reception of the strut; (e) a fastener for securing the seat to the strut; and (f) a stop for limiting relative motion between the elongated portion and the body.

Typically, the present invention will be used with a U-lock of the type described above. For a U-lock, the splines are located on a straight portion of one of the legs of the shackle. The free end of that leg is inserted into the hub opening before assembling the crossbar to the shackle.

The body has a hub opening for receiving the elongated portion of the lock. Within the hub opening is at least one groove that is sized to fit the splines. If there is more than one groove, the grooves are equidistantly spaced about the hub opening so that the lock can be rotated into a convenient position before the splines engage the grooves.

The body is attached to a strut of the bicycle frame at the seat. A fastener provides the secure attachment. In one embodiment, the seat is a semi-cylindrical surface and the fastener includes an opening in the medial section in which is located a spindle, a strap extending around the strut that hooks onto buttons extending from the ends of the spindle, and a screw through the hub and into a threaded hole in the spindle that, when turned, pulls the spindle away from the strut, tightening the strap around the strut. In another embodiment of the seat, integral portions of the seat extend around the strut and the fastener includes at least one screw/nut combination that tightens the seat to the strut. In another embodiment, the seat is a semi-cylindrical surface and a hose clamp extends through a hole in the medial section and around the strut. The hose clamp is tightened to hold the seat securely to the strut.

There are two basic embodiments of the splines of the present invention. In the first embodiment, the splines are integral with the elongated portion of the lock. In the second embodiment, the splines are located on a collar that is affixed to the elongated portion of the lock. The collar has a tubular shape that surrounds the elongated portion. There is a gap in the wall of the collar that is compressed by a screw/nut combination in order to frictionally affix the collar to the elongated portion.

The stop for limiting relative motion between the elongated portion and the body has two basic embodiments. In the first embodiment, the splines extend into the grooves until either a spline contacts a wall at the bottom of a groove or a shoulder at the top of the splines contacts the upper surface of the body. In the second embodiment, there is a latch extending into and across the hub opening. As the splines enter the grooves, the latch is forced out of the hub opening until an annular break in the splines is reached. At that point the latch snaps into the annular break, securing the elongated portion of the lock. The elongated portion is removed by manually disengaging the latch from the annular break.

Other objects of the present invention will in part be obvious and will in part appear hereinafter.

BRIEF DESCRIPTION OF THE DRAWINGS

For a fuller understanding of the nature and objects of the present invention, reference is made to the following specification, which is to be taken in connection with the accompanying drawings, wherein.

DETAILED DESCRIPTION

Figure 1:
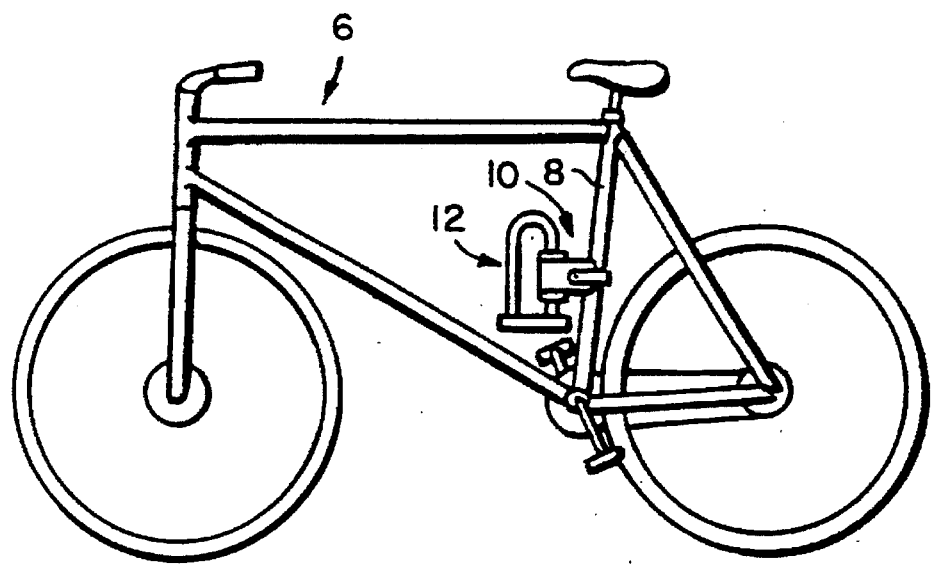
FIG. 1 is a side view of the present invention in use.
Figure 2:
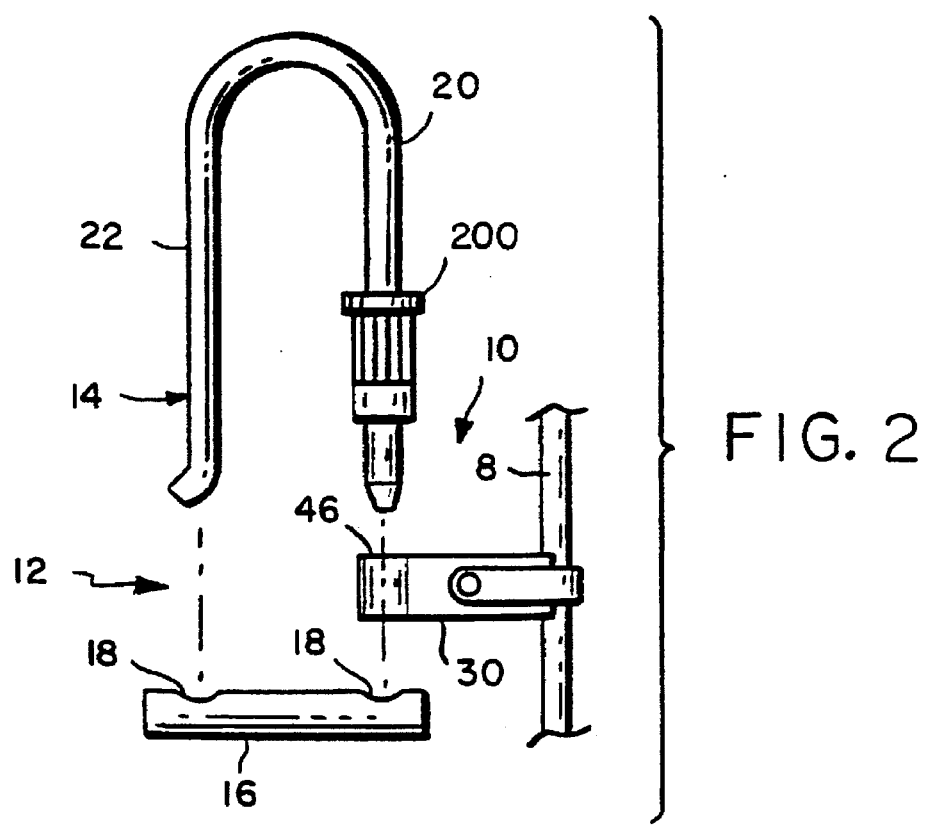
FIG. 2 is a side view of the present invention in partial disassembly.
Figure 3:
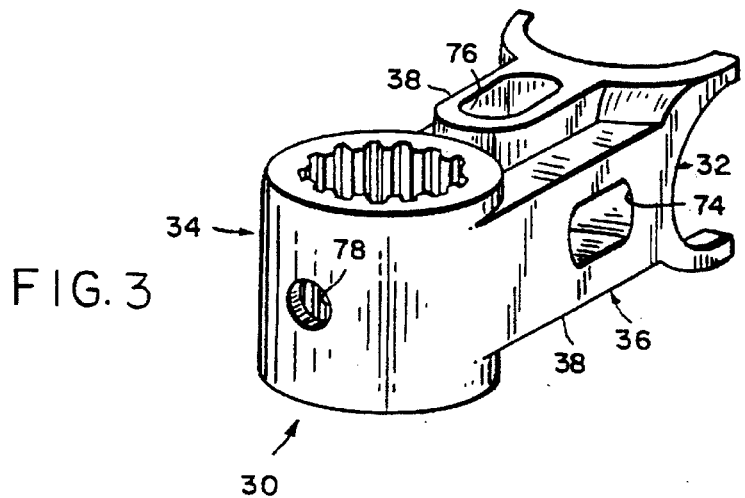
FIG. 3 is a perspective view of the draw bar embodiment of the seat of the present invention.

One embodiment of the bracket of the present invention 10 is shown in FIGS. 1 and 2. In FIG. 1, the bracket 10 is shown as attaching a U-type bicycle lock 12 to a bicycle 6. As in FIG. 2, a U-lock having as components (1) a shackle 14 having generally parallel legs 20, (2) a crossbar 16 having apertures 18 for engaging the legs 20, 22 and a lock for optionally securing the shackle 14 and crossbar 16 together in order to anchor a part of the bicycle 6 to a stationary post or the like.

The bracket 10 of the present invention includes two components, the body 30 and the insert 200. The body 30 attaches to a tubular frame strut 18 of the bicycle 8 and the insert 200 is affixed to a shackle leg 20. The insert 200 fits into an opening 150 in the body 30, where splines 262 on the insert 200 mate with grooves 154 in the body opening 150. Body The body 30 is the component that attaches to the bicycle 6 and is shown in detail in FIGS. 3 to 18. It has three sections, a seat 32 at one end of the body 30, a hub 34 at the other end, and a medial section 36 between the seat 32 and hub 34. The medial section 36 has a framework with a plurality of ribs 38 for maintaining the rigidity of the body 30. The seat 32 is adapted to permit the body 30 to be mounted to the frame strut 8 and has several embodiments. The present invention contemplates using any form of mounting that is adequate for a bicycle, three of which are described below.

Figure 4:
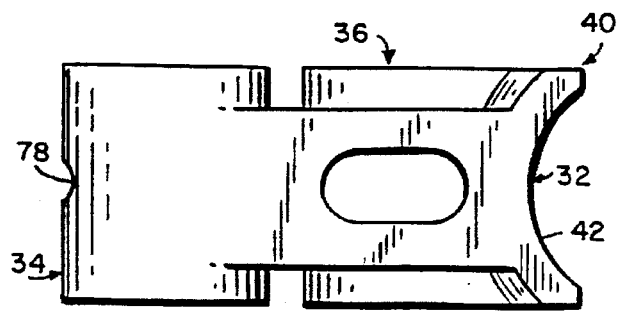
FIG. 4 is a side view of the body of FIG. 3.
Figure 5:
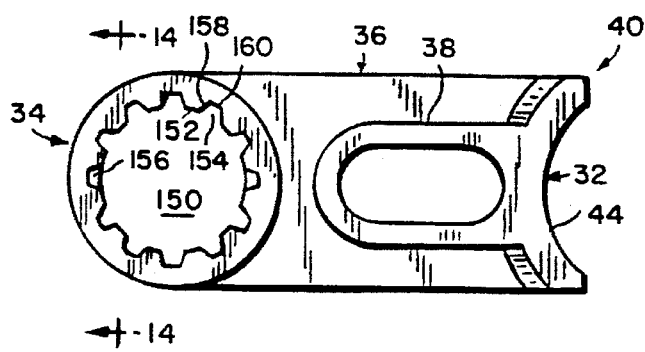
FIG. 5 is a top view of the body of FIG. 3.

In the draw bar embodiment 40 of the seat, shown in FIGS. 3 to 9, the seat 32 consists of two semi-cylindrical surfaces 42, 44 at right angles to each other, such that, when viewed from both the side and top, as in FIGS. 4 and 5, respectively, the seat appears as a semi-cylinder. Preferably, both semi-cylindrical surfaces 42, 44 have a radius of 0.625 inches and extend over about 110° of arc.

Figure 7:
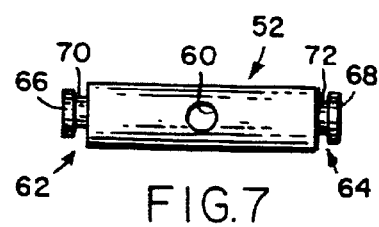
FIG. 7 is a front view of the spindle of FIG. 6.
Figure 6:
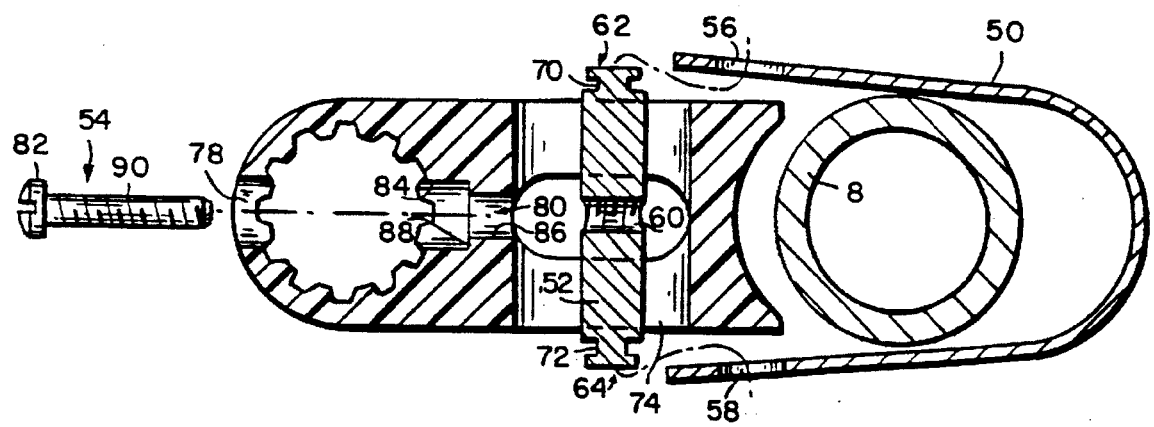
FIG. 6 is a cross-sectional, exploded view of one configuration of the draw bar embodiment of FIG. 3.
Figure 8:
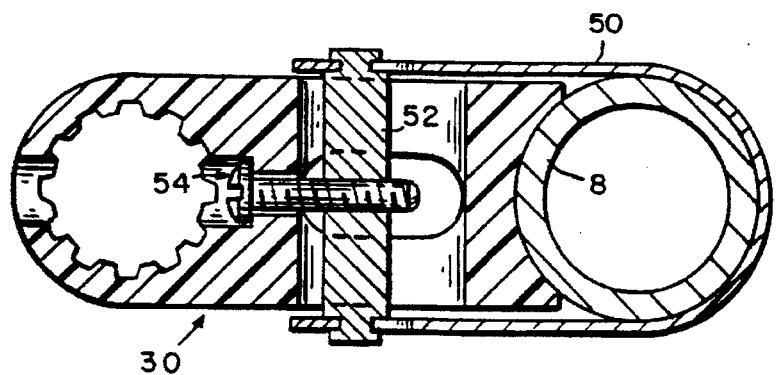
FIG. 8 is a cross-sectional, assembled view of the draw bar embodiment of FIG. 6.

The draw bar embodiment 40 is mounted to the frame strut 8 by a draw bar mechanism. As shown in FIG. 6, this mechanism includes a strap 50, a spindle 52, and a screw 54. The strap 50 is an elongated, flexible metal strip with at least one pair of holes 56, 58 near the ends. The spindle 52, shown in FIG. 7, is a cylindrical metal bar with a threaded opening 60 through the center and a mushroom-shaped buttons 62, 64 at each end. The outer portion of the button 66, 68 is smaller than the diameter of the strap hole 56, 58 and the inner portion of the button 70, 72 is smaller in diameter than the outer portion 66, 68.

The spindle 52 is located in a slot 74 that extends through the medial section 36 near the seat 40. The long dimension of the slot 74 is perpendicular to the axis of one of the semi-cylindrical surfaces 44. A second slot 76 having the same shape as the first slot 74 is located perpendicular to and intersecting the first slot 74, so that the long dimension of the second slot 76 is perpendicular to the axis of the other semi-cylindrical surface 42. With the spindle 52 located in the slot 74, the spindle buttons 62, 64 extend from the slot 74. The screw 54 extends through a pair of axially aligned holes 78, 80 in the wall of the hub opening 150 and is threaded into the spindle opening 60. The diameter of the outer hub wall hole 78 is larger than the diameter of the screw head 82. The inner hub wall hole 80 has two portions, the larger portion 84, which is larger in diameter than the screw head 82, and the smaller portion 86, which is smaller in diameter than the diameter of the screw head 82 but larger than the diameter of the screw threads 90. Thus, when the screw 54 is turned into the spindle opening 60, the spindle 52 is pulled away from the seat 40 because the shoulder 88 created by the difference in the diameters of the inner hub wall hole sections 84, 86 prevents the screw head 82 from passing completely through the hole 80.

The draw bar embodiment 40 is mounted to the bicycle 6 by first placing one of the semi-cylindrical surfaces 42, 44 against the frame strut 8. One of the strap holes 56 is placed over one of the spindle buttons 62 until the hole 56 is resting on the inner portion of the button 70. The strap 50 is wrapped 180° around the frame strut 8 and the other strap hole 58 is place over the other spindle button 64 until the hole 58 is resting on the inner portion of that button 72. The screw 54 is turned into the spindle opening 60 to pull the spindle 52 away from the seat 40 until the strap 50 is tight and the body 30 is securely attached to the frame strut 8, as in FIG. 8.

Figure 9:
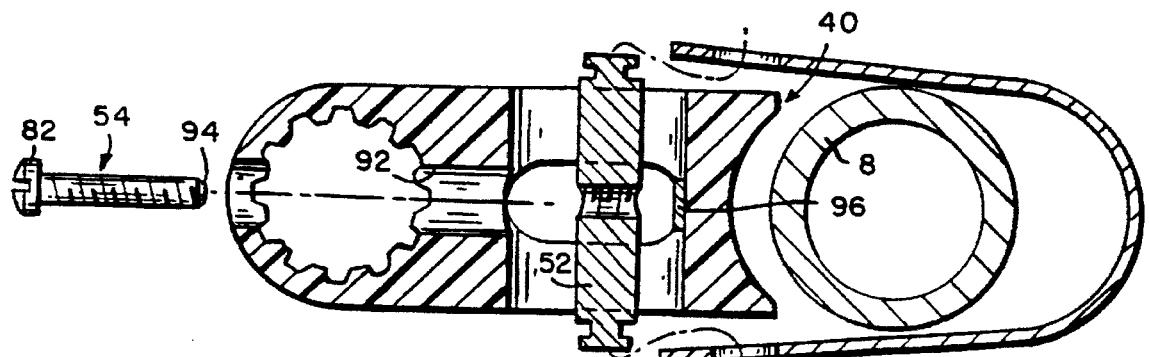
FIG. 9 is a cross-sectional, exploded view of another configuration of the draw bar embodiment of FIG. 3.

In an alternate configuration of the draw bar embodiment, as in FIG. 9, the inner hub wall hole 92 is larger than the screw head 82. The end of the screw 94 rests against a point behind the seat surface 96 so that when the screw 54 is turned, it pushes against the point 96 and the spindle 52 is pulled away from the seat 40.

Other configurations of the draw bar embodiment are contemplated, including different numbers of semi-cylindrical surfaces and slots.

Figure 10:
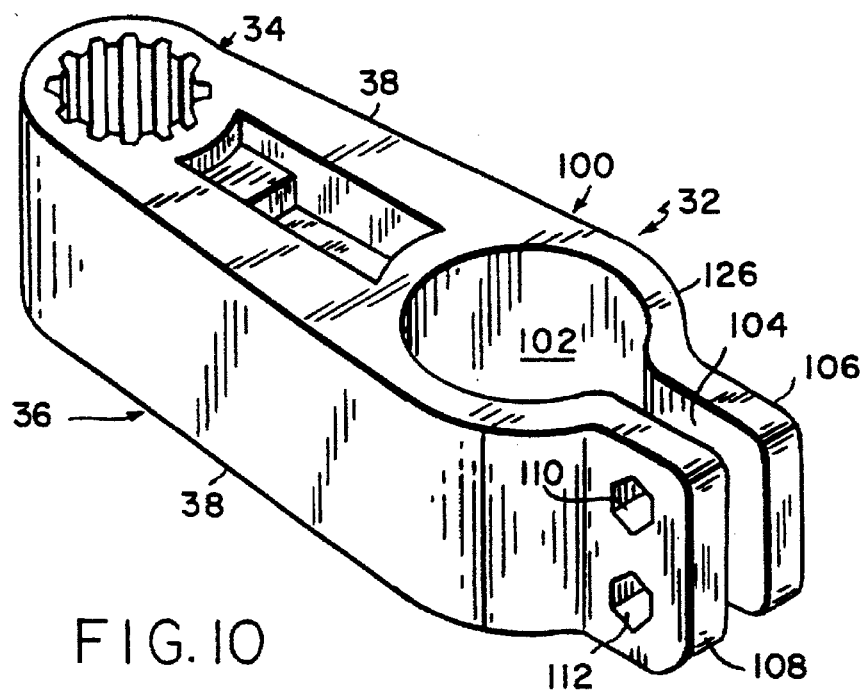
FIG. 10 is a perspective view of the unitary embodiment of the seat of the present invention.
Figure 11:
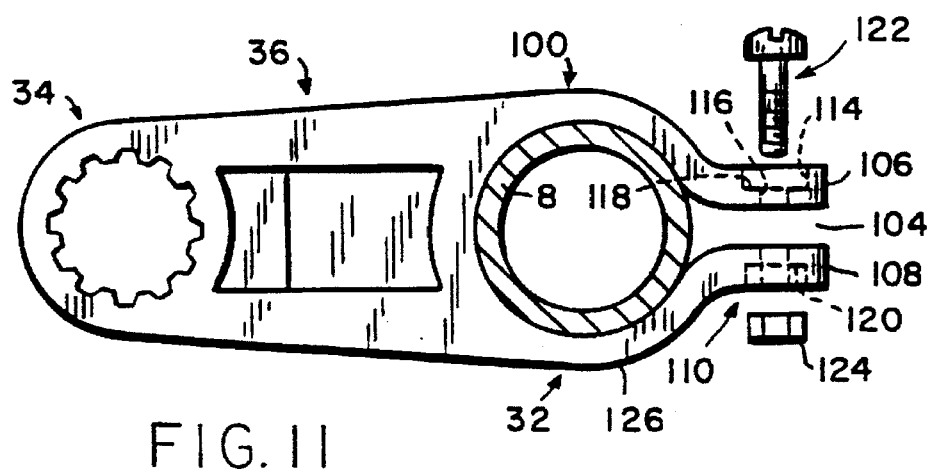
FIG. 11 is a partial cross-sectional, exploded view of the unitary embodiment of FIG. 10.

The unitary embodiment 100 of the seat 32 is shown in FIGS. 10 and 11. The seat 32 consists of through cylindrical opening 102 that has a gap 104 in the wall 126. The gap can be located any place along the wall 126, but is preferably located at the point most remote from the hub 34. Preferably, the opening 102 has a diameter of about 1.25 inches. Extending substantially perpendicular from the edges of the gap 104 are a pair of opposed flanges 106, 108. The flanges 106, 108 have a pair of axially-aligned through mounting holes 110, 112. The outer portions of the holes 114 are larger than the inner portion 116, creating a pair of shoulders 118, 120 in each hole.

The unitary embodiment 100 is mounted to the frame strut 8 by enlarging the gap 104, for example, by hand, until it fits over the strut 8 and allowing the opening 102 to spring back into shape. A screw 122 is inserted into each of the mounting holes 110, 112 and a nut 124 is turned onto the screw 122 until the opening 102 is clamped tightly to the strut 18.

Figure 12:
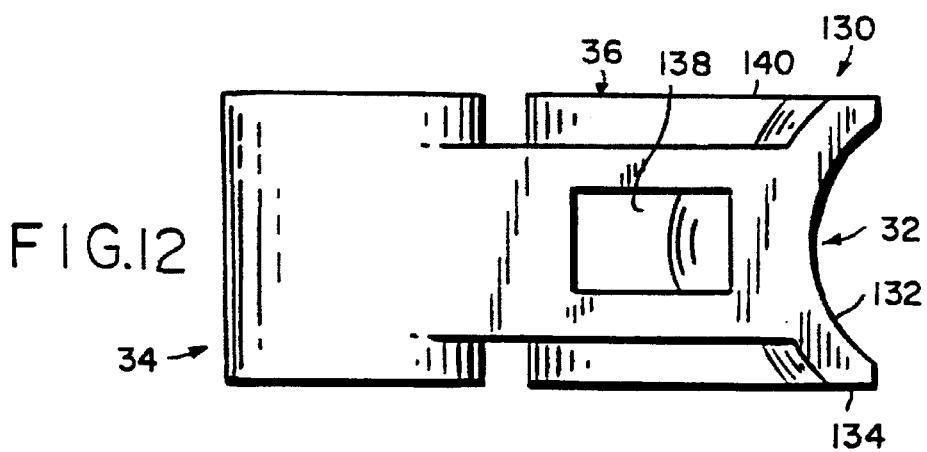
FIG. 12 is a side view of the clamp embodiment of the seat of the present invention.
Figure 13:
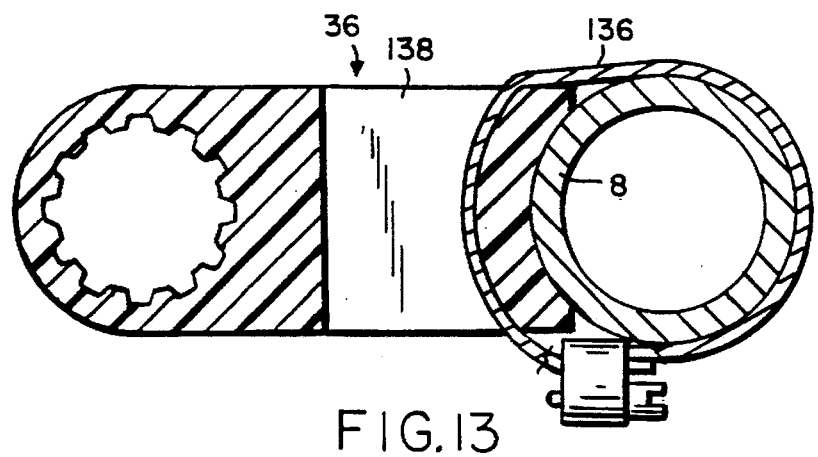
FIG. 13 is a cross-sectional, assembled view of the clamp embodiment of FIG. 12.

The clamp embodiment 130 of the seat 32 is shown in FIGS. 12 and 13. It is similar to the draw bar embodiment 40 in that the seat 32 consists of two semi-cylindrical surfaces 132, 134 at right angles to each other, such that, when viewed from both the side and top, the seat 32 appears as a semi-cylinder. Preferably, both semi-cylindrical surfaces 132, 134 have a radius of 0.625 inches and extend over about 110° of arc.

The clamp embodiment 130 is mounted to the frame strut 8 by a hose clamp 136 or other similar device that fits through one of a pair of curved slots 138, 140 that extend through the medial section 36 near the seat 32. The curve of one slot 138 is concentric with the wall of one of the semi-cylindrical surfaces 132. The second slot 140 is located such that it intersects the first slot 138, so that the curve of the second slot 140 is concentric with the wall of the second semi-cylindrical surface 134.

As in FIG. 13, the clamp embodiment 130 is mounted to the bicycle 6 by first placing one of the semi-cylindrical surfaces 132, 134 against the frame strut 8. One end of the clamp 136 is inserted through the appropriate slot 138, 140, and the clamp is tightened around the strut 8.

Other configurations of the clamp embodiment are contemplated, including different numbers of semi-cylindrical surfaces and slots.

At the opposite end of the body 30 from the seat 32 is the hub 34. The hub 34 has a through opening 150, the inner surface of which is substantially cylindrical with a preferred diameter of 0.760 inches.

Figure 14:
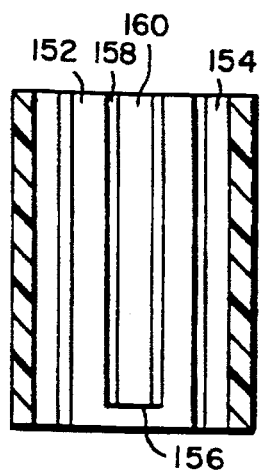
FIG. 14 is a cut-away view of a portion of the hub of FIG. 5 along the line 14—14.

In the multi-groove embodiment, the details of which are shown in FIGS. 5 and 14, there are a plurality of grooves 154 in the inner surface of the opening 152. The grooves 154 are substantially parallel with the axis of the opening 150. In one configuration, the grooves 154 extend for the entire length of the opening 150. In another configuration, the grooves 154 extend for the entire length of the opening 150 except for at least one groove 154, which extends from one end of the opening 150 to a short distance from the other end of the opening 150, thereby having a closed end 156, as in FIG. 14. Preferably, the grooves 154 are 0.125 inches deep. The sides of the grooves 158 are inclined at an angle of approximately 70° from the hole surface 152 and the width of each groove 154 is substantially 0.079 inches at its inner edge 160. In a preferred embodiment, there are 12 grooves 154 spaced equidistantly about the opening surface 152 and two opposed grooves 154 have closed ends 156.

Figure 15:
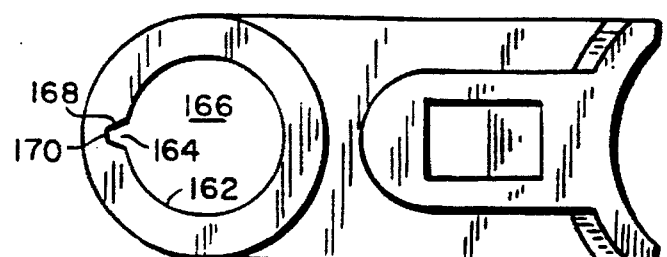
FIG. 15 is a top view of the single-groove embodiment of the hub.

In the single-groove embodiment, the top view of which is shown in FIG. 15, there is a single groove 164 in the opening surface 162. The groove 164 is substantially parallel with the axis of the opening 166. In one configuration, the groove 164 extends for the entire length of the opening 166. In another configuration, the groove 164 extends from one end of the opening 166 to a short distance from the other end of the opening 166, thereby having a closed end. Preferably, the groove 164 has a depth of 0.125 inches. The sides of the groove 168 are inclined at an angle of approximately 70° from the opening surface 162 and the width of the groove 164 is substantially 0.079 inches at its inner edge 170.

Figure 16:
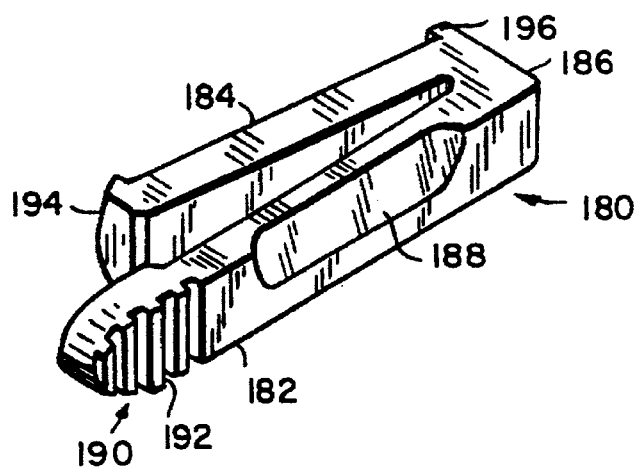
FIG. 16 is a perspective view of one embodiment of the latch.
Figure 17:
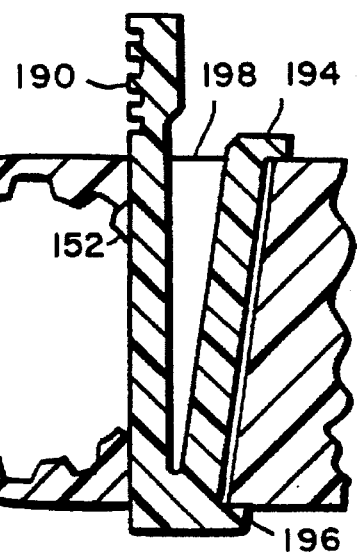
FIG. 17 is a cross-sectional, assembled partial view of the latch embodiment of FIG. 16.

Another embodiment of the hub 34 includes a latch 180 for securing the insert 200 into the hub opening 150, the preferred embodiment of which is shown in FIGS. 16 and 17. It is contemplated that the latch 180 can be implemented with any of the previously described embodiments of the body. In its preferred embodiment, the latch 180 has a basic U shape with two legs 182, 184 connected at one end by a cross piece 186. The cross piece 186 acts as a spring to bias the ends of the legs 182, 184 apart. The legs 182, 184 have essentially a rectangular cross-section, but with one outer edge of the center portion of one leg being chamfered 188. The purpose of the chamfer 188 is described below with the insert 200. The outside surface of the end of the chamfered leg 182 is a pad 190 containing non-slip grooves 192. Extending perpendicularly from the ends of the other leg 184 are a pair of flanges 194, 196, the purpose of which is described below.

The latch 180 fits in a hole through the hub 198 that is tangential to the hub opening surface 152. The latch is oriented such that the pad 190 extends from one end of the hole 198 and the grooves 192 face toward the hub 34. The two flanges 194, 196 straddle the outer edges of the hole 198 to hold the latch 180 in position. The spring biases the chamfered leg 182 into the hub opening 150. When the pad 190 is pressed rearwardly, the chamfered leg 182 retracts from the hub opening 150.

Figure 18:
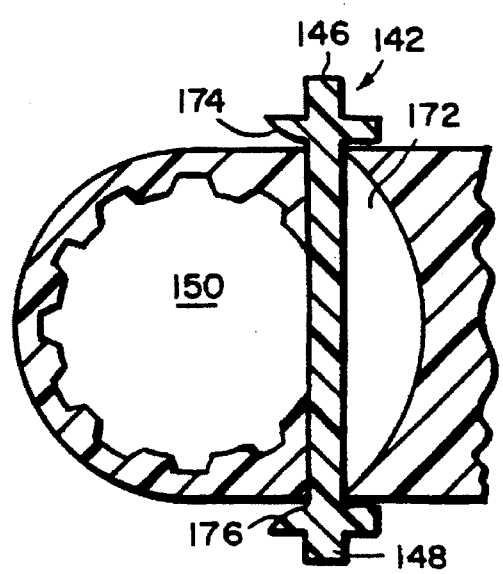
FIG. 18 is a partial cross-sectional, assembled partial view of another embodiment of the latch.

In an alternate latch embodiment, shown in FIG. 18, the latch 142 is a substantially straight rod. The cross-sectional shape of the rod is unimportant, but is preferably rectangular with the upper edge of the center portion being chamfered 144. The two ends of the latch 146, 148 extend from a hole in the hub 172. The latch 142 is held in the hole 172 by flanges 174, 176 extending from both sides of the rod. The latch 142 is normally substantially straight, cutting a chord through the hub opening 150. When the ends of the latch 146, 148 are pressed together, the latch 142 bows such that it retracts from the hub opening 150.

Preferably, the body 30 and latch 180 are composed of a rigid plastic, such as ABS, nylon 6/6, or glass-filled nylon 6/6.

Insert

Figure 19:
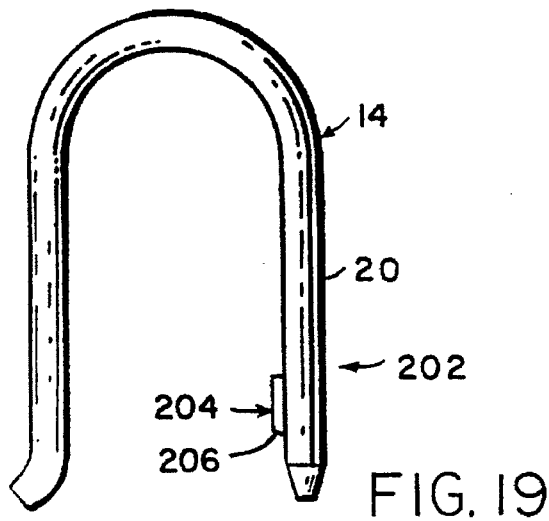
FIG. 19 is a side view of one configuration of the integral embodiment of the insert of the present invention.
Figure 20:
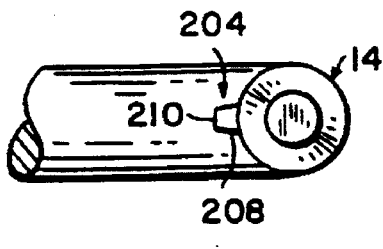
FIG. 20 is a bottom view of the insert of FIG. 19.

The one configuration of the integral embodiment 202 of the collar 200 is shown in FIGS. 19 and 20. In this embodiment, a single spline 204 extends outwardly from the shackle leg 20. The spline 204 is substantially parallel with the axis of the shackle leg 20 and extends for a length of about 1 inch. The spline 204 preferably extends outwardly about 0.125 inches from the shackle leg 20. Preferably, the approximately 0.073 inches of the spline closest to the end of the leg 206 is chamfered at an angle of about 45°. The sides of the spline 208 are inclined at an angle of about 70° from the leg 20 and the width of the spline outer edge 210 is about 0.720 inches. This embodiment contemplates that the spline 204 may be located at any angle about the circumference of the shackle leg 20. This embodiment also contemplates that there can be more than one spline 204 extending from the leg 20.

Figure 21:
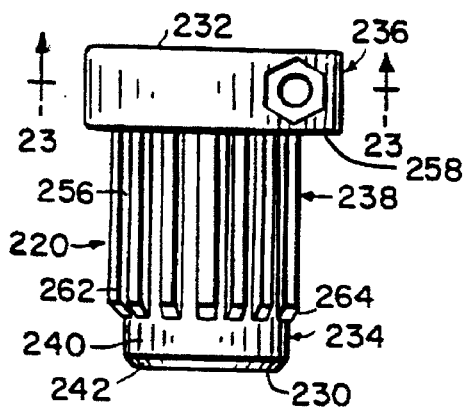
FIG. 21 is a side view of the multi-spline embodiment of the collar of the present invention.

One configuration of the collar embodiment 220 of the insert 200 is shown in FIG. 21. The collar 220 is tubular in shape and is about 1.50 inches long. The cross-section of the central bore of the collar 222 is preferably circular, but other shapes, such as square, hexagonal, or octagonal, are contemplated and the use of such shapes depends on the cross-section of the shackle 14 to which the collar 220 is attached. Regardless of the shape of the bore 222, the dimensions of the bore cross-section remain substantially constant throughout the entire length of the collar 220. The diameter of a circular bore 222 is preferably in the range of from 0.440 to 0.635 inches.

Figure 22:
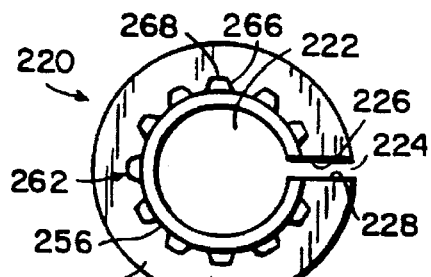
FIG. 22 is a bottom view of the collar of FIG. 21.
Figure 23:
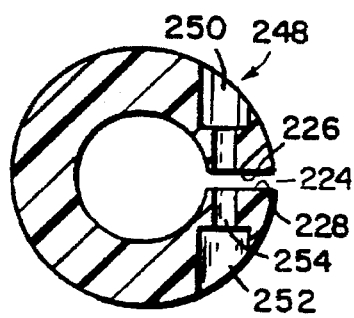
FIG. 23 is a cross-sectional view of the collar of FIG. 20 taken along the line 23—23.

As can been seen in FIGS. 22 and 23, there is a gap 224 in the wall of the collar 220 that extends completely through the wall for the entire length of the collar 220 and is parallel to the axis of the bore 222. The gap 224 is about 0.080 inches wide and is bordered by two edges of the collar wall 226, 228.

As shown in FIG. 21, there are three contiguous sections over the length of the collar 220: the guide 234 at one end 230, the clamp 236 at the other end 232, and the spline section 238 between the guide 234 and the clamp 236. Preferably, the outside surface of the guide 240 is substantially smooth and extends about 0.225 inches from the end 230. Preferably, the outside diameter of the guide 234 is about 0.725 inches and the about 0.030 inches adjacent to the end 242 is chamfered at an angle of about 45°.

Figure 26:
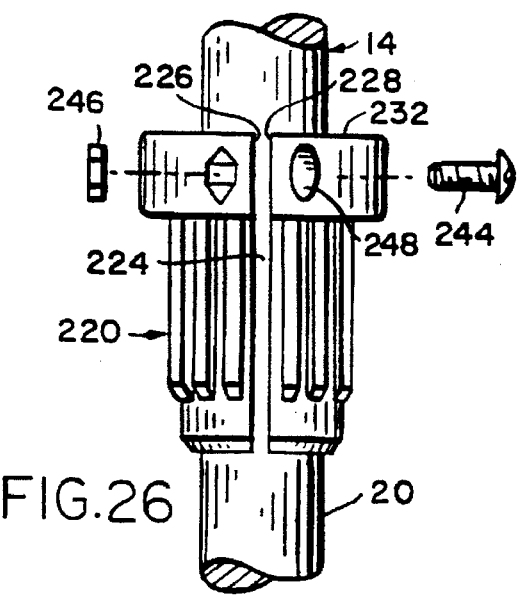
FIG. 26 is an exploded side view of how the collar is attached.

Extending for about 0.375 inches from the other end of the collar 232, with an outside diameter of about 1.250 inches, is the clamp 236. The purpose of the clamp 236 is to immovably secure the collar 220 to the shackle 14, as in FIG. 26. The clamp 236 secures the collar 220 to the shackle 14 by squeezing together the two edges 226, 228 bordering the gap 224 after the collar 220 is positioned on the shackle 14. The gap 224 will narrow or, if the diameter of the portion of the shackle 14 to which the collar 220 is secured is small enough, the gap 224 will disappear entirely when the edges 226, 228 touch. The squeezing is done by a screw 244 and nut 246 combination extending through a cylindrical bore 248. The bore 248 runs perpendicularly through the gap edges 226, 228. The axis of the bore 248 is about 0.420 inches from the center of the collar bore 222 and about 0.188 inches from the end of the collar 232. The bore 248 has a diameter of about 0.174 inches. Each end of the bore 248 has an approximately 0.280-inch-diameter hexagonal countersink 250, 252. The countersinks 250, 252 have substantially the same depth and are such that the length of the narrow section of the bore 254 is about 0.400 inches.

Between the guide section 234 and clamp section 236 is the spline section 238. The surface of the spline section 256 is substantially cylindrical with a diameter of about 0.750 inches. The difference in diameter between the clamp 236 and the spline section 238 creates a shoulder 258.

In the multi-spline embodiment 220, a plurality of splines 262 extend outwardly from the spline section surface 256. The splines 262 are substantially parallel with the axis of the collar bore 222 and extend over the entire length of the spline section 238. Each spline 262 preferably extends outwardly about 0.125 inches from the spline section surface 256. As a result, the outer diameter of the spline section 238 at the outer edge of the splines 268 is about 0.250 inches greater than the diameter of the spline section surface 256. The sides of the splines 266 are inclined at an angle of about 70° from the spline section surface 256 and the width of each spline 262 is about 0.720 inches at its outer edge 268.

Preferably, the approximately 0.073 inches of the splines 264 adjacent to the guide 234 is chamfered at an angle of about 45°. There are preferably 12 splines 262 spaced equidistantly about the spline section surface 256.

Figure 24:
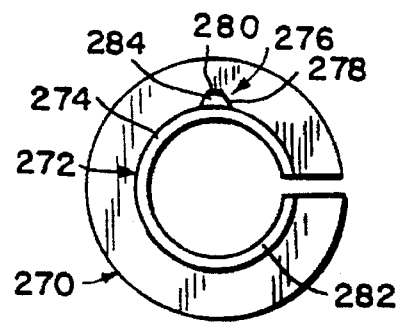
FIG. 24 is a bottom view of the single-spline embodiment of the collar of the present invention.

In the single-spline embodiment 270, the bottom view of which is shown in FIG. 24, a single spline 276 extends outwardly from the spline section surface 274. The spline 276 is substantially planar with the axis of the collar 270 and extends over the entire length of the spline section 272. The spline 276 preferably extends outwardly about 0.125 inches from the spline section surface 274. Preferably, the approximately 0.073 inches of the spline 284 adjacent to the guide 282 is chamfered at an angle of about 45°. The sides of the spline 278 are inclined at an angle of 70° from the spline section surface 74 and the width of the spline outer edge 80 is 0.720 inches.

Figure 25:
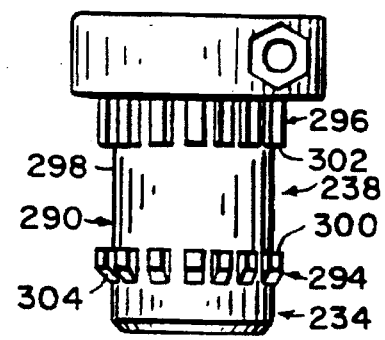
FIG. 25 is a side view of the multi-spline configuration of the collar for use with a latch configuration of the body.

FIG. 21 shows the collar 220 with splines that extend the entire length of the spline section. A different configuration of the spline section, shown in FIG. 25, is required for use with the latch configuration of the body. The latch configuration 290 of the collar is essentially the same as the previously described configurations, with the exception that the splines do not extend the entire length of the spline portion 238. Each spline 292 is split into two linearly aligned portions, the bottom portion 294 adjacent to the guide section 234 and the top portion 296 adjacent to the clamp section 236. The bottom portion 294 is about 0.154 inches long and the top portion 296 is about 0.380 inches long. Between the bottom portion 294 and the top portion 296 is the latch portion 298, where the surface of the spline section is exposed throughout the entire circumference of the spline section 238. The upper edge of the bottom portion 300 and the lower edge of the top portion 302 are substantially at right angles to the surface of the latch portion 298. Preferably, the approximately 0.073 inches of the bottom portion adjacent to the guide 304 is chamfered at an angle of about 45°.

Preferably, the collar 20, 70 is composed of a rigid plastic, such as ABS, nylon 6/6, or glass-filled nylon 6/6.

OPERATION

The body 30 is attached to a bicycle frame strut 8, as described above, such that the hub opening 150 is approximately vertical. If a collar embodiment 220, 270 of the insert 200 is used, the collar 220, 270 is attached to a component of the lock 12, for example, the shackle 14. A free end of the shackle 14 is inserted into the clamp end 232 of the collar bore 222 and the collar 220, 270 is positioned on the shackle 14 so that it will not interfere with the operation of the lock 12. After the collar 220, 270 is positioned, the screw 244 is inserted into the clamp bore 248 and is secured with the nut 246 until the collar 220, 270 will not move relative to the shackle 14 when in normal use.

To attach the lock 12 to the bicycle 6, the free end of the leg of the shackle 20 on which the insert 200 is located is inserted into the hub opening 150 from the top. As the shackle 14 continues into the hub opening 150, the guide 234 enters the hub opening 150, aligning the axis of the insert 200 with the axis of the hub opening 150. As the insert 200 continues into the hub opening 150, the splines 262 of the spline section 238 mate with the grooves 154 of the hub opening 150. The insert 200 continues into the hub opening 150 until either the shoulder 258 makes contact with the top of the hub portion 46 or the chamfered end of the splines 264 make contact with the closed end 160 of one or more of the grooves 154.

When using either of the latch configurations, the free end of the leg of the shackle 20 on which the collar 290 is attached is inserted into the hub opening 150 from the top. As the shackle 14 continues into the hub opening 150, the guide 234 enters the hub opening 150, aligning the axis of the collar 290 with the axis of the hub opening 150. As the collar 290 continues into the hub opening 150, the bottom portion of the splines 294 mate with the grooves 154 of the hub opening 150. Eventually, the chamfered end of the bottom portion 304 makes contact with the chamfered portion of the latch 144, 188. Downward pressure on the shackle 14 forces the chamfered portion 144, 188 out of the hub opening 150. When the latch portion 298 is even with the chamfered portion 144, 188, the chamfered portion 144, 188 snaps into the latch portion 298. The bottom edge of the top portion 302 prevents the shackle 14 from moving any farther into the hub opening 150 and the upper edge of the bottom portion 300 prevents the shackle 14 from being accidentally removed from the hub opening 150.

To remove the shackle 14 from the hub opening 150 for the first latch configuration 180, the latch pad 190 is pressed fully toward the body seat 32, disengaging the chamfered portion 188 from the collar 290, and the shackle 14 is pulled from the hub opening 150. To remove the shackle 14 from the hub opening 150 for the second latch configuration 142, the ends of the latch 146, 148 are pressed together, disengaging the chamfered portion 144 from the collar 290, and the shackle 14 is pulled from the hub opening 150.

In the single-spline embodiment, the shackle 14 can be rotated about the axis of the hub opening 150 before the spline 204, 280 and groove 154 mate, providing the ability to place the lock 12 in the most convenient position for the bicycle 6.

In the multi-spline embodiment, because the hub grooves 154 are the same size and equidistantly spaced about the hub hole surface 152 and the collar splines 262 are the same size and equidistantly spaced about the spline section 238, the shackle 14 can be rotated about the axis of the hub opening 150 before the splines 262 and grooves 154 mate, providing the ability to place the lock 12 in the most convenient position for the bicycle 6. The multi-spline embodiment provides more stability to the connection between the body 30 and insert 200 than the single-spline embodiment.

After the shackle 14 is positioned and the splines 204, 262, 280 and grooves 154 are completely mated, the crossbar 16 is assembled to the shackle 14, effectively securing the lock 12 to the bicycle 6. By securing the lock 12 to the bicycle 6 in this manner, the lock 12 cannot be ejected from the bracket 10 during an accident, thus preventing further injury.

What is claimed is:

1. A bracket system for securely holding a lock on a strut of a cycle frame, said lock including an elongated portion with an axis and an optionally free end, said bracket system comprising:
   (a) at least a spline on said elongated portion, said spline being substantially parallel to said elongated portion axis;
   (b) a body having a hub at one end, a seat at the other end, and a medial section therebetween;
   (c) said hub having an opening along a hub axis for reception of said elongated portion, said hub having a cross-sectional profile that presents at least a groove parallel to said hub axis for reception of said spline;
   (d) said seat being disposed along a seat axis for reception of said strut;
   (e) a fastener for securing said seat to said strut; and
   (f) a stop for limiting relative motion between said elongated portion and said body.

2. The bracket system of claim 1 wherein there is only one of said splines and only one of said grooves, said groove extending less than the entire length of said hub opening, thereby having a closed end, and wherein said stop includes said closed end.

3. The bracket system of claim 1 wherein there is at least two of said grooves.

4. The bracket system of claim 3 wherein there are the same number of said grooves and said splines.

5. The bracket system of claim 3 wherein said grooves extend less than the entire length of said hub opening, thereby having a closed end, and wherein said stop includes said closed end.

6. The bracket system of claim 3 wherein said grooves are of substantially the same size and substantially equidistantly spaced about said hub opening and wherein said splines are of substantially the same size and spaced apart by substantially the same distance as said grooves.

7. The bracket system of claim 1 wherein said spline includes two aligned portions and a spline gap therebetween and wherein a latch extends into said spline gap when said elongated portion is received by said hub opening.

8. The bracket system of claim 7 wherein said latch includes a means for the biasing of said latch into said spline gap and a means for the manual retraction of said latch from said spline gap.

9. A bracket system for securely holding a lock on a strut of a cycle frame, said lock including an elongated portion with an axis and an optionally free end, said bracket system comprising:
   (a) a collar for affixation about a leg of said elongated portion, said collar having a central bore and an outer surface, said bore having an axis;
   (b) said collar having at least a spline on said outer surface that is parallel to said bore axis;
   (c) a body having a hub at one end, a seat at the other end, and a medial section therebetween;
   (d) said hub having an opening along a hub axis for reception of said elongated portion, said hub having a cross-sectional profile that presents at least a groove parallel to said hub axis;
   (e) said seat being disposed along a seat axis for reception of said strut;
   (f) a fastener for securing said seat to said strut; and
   (g) a stop for limiting relative motion between said elongated portion and said body.

10. The bracket system of claim 9 wherein said collar has a gap extending from said bore to said outer surface, said gap being the length of said bore and substantially parallel to said bore axis, said collar being affixed to said elongated portion by compressing said gap by a screw extending through a hole in said collar that is perpendicular to said gap and a nut turned on to said screw.

11. The bracket system of claim 9 wherein there is only one of said splines and only one of said grooves.

12. The bracket system of claim 11 wherein said groove extends less than the entire length of said hub opening, thereby having a closed end, and wherein said stop includes said closed end.

13. The bracket system of claim 11 wherein said groove extends the entire length of said hub opening and said stop includes a shoulder extending outwardly from said collar along a plane that is transverse with respect to said bore axis.

14. The bracket system of claim 9 wherein there is at least two of said grooves.

15. The bracket system of claim 14 wherein there are the same number of said grooves and said splines.

16. The bracket system of claim 14 wherein said grooves extend the entire length of said hub opening and said stop includes a shoulder extending outwardly from said collar along a plane that is transverse with respect to said bore axis.

17. The bracket system of claim 14 wherein at least one of said grooves extends less than the entire length of said hub opening, thereby having a closed end, the remainder of said grooves extend the entire length of said hub opening, and wherein said stop includes said closed end.

18. The bracket system of claim 14 wherein said grooves are of substantially the same size and substantially equidistantly spaced about said hub opening and wherein said splines are of substantially the same size and spaced apart by substantially the same distance as said grooves.

19. The bracket system of claim 9 wherein said spline includes two aligned portions and a spline gap therebetween and wherein a latch extends into said spline gap when said elongated portion is received by said hub opening.

20. The bracket system of claim 19 wherein said latch includes a means for the biasing of said latch into said spline gap and a means for the manual retraction of said latch from said spline gap.

21. A bracket system for securely holding a lock on a strut of a cycle frame, said lock including an elongated portion with an axis and an optionally free end, said bracket system comprising:

(a) a collar for affixation about a leg of said elongated portion, said collar having a central bore and an outer surface, said bore having an axis, said collar having a gap extending from said bore to said outer surface, said gap being the length of said bore and substantially parallel to said bore axis, said collar being affixed to said elongated portion by compressing said gap by a screw extending through a hole in said collar that is substantially perpendicular to said gap and a nut turned on to said screw;

(b) said collar having a plurality of splines on said outer surface that are parallel to said bore axis, said splines being substantially equally spaced about said outer surface and being of substantially the same size and shape;

(c) a body having a hub at one end, a seat at the other end, and a medial section therebetween;

(d) said hub having an opening along a hub axis for reception of said elongated portion, said hub having a cross-sectional profile that presents a plurality of grooves parallel to said hub axis, said grooves being substantially equally spaced about said about said hub opening and being of substantially the same size and shape, the quantity of said grooves being equal to the quantity of said splines;

(e) said seat being disposed along a seat axis for reception of said strut;

(f) a fastener for securing said seat to said strut; and (g) a stop for limiting relative motion between said elongated portion and said body, said stop including a shoulder extending outwardly from said collar along a plane that is transverse with respect to said bore axis.

22. The bracket system of claim 21 wherein each of said splines includes two aligned portions and a spline gap therebetween and wherein a latch extends into said spline gap when said elongated portion is received by said hub opening, said latch including a means for the biasing of said latch into said spline gap and a means for the manual retraction of said latch from said spline gap.

* * * * *